July 11, 1933.   R. O. CLARK   1,917,922
PHOTOGRAPH MOUNTING
Filed Nov. 19, 1932
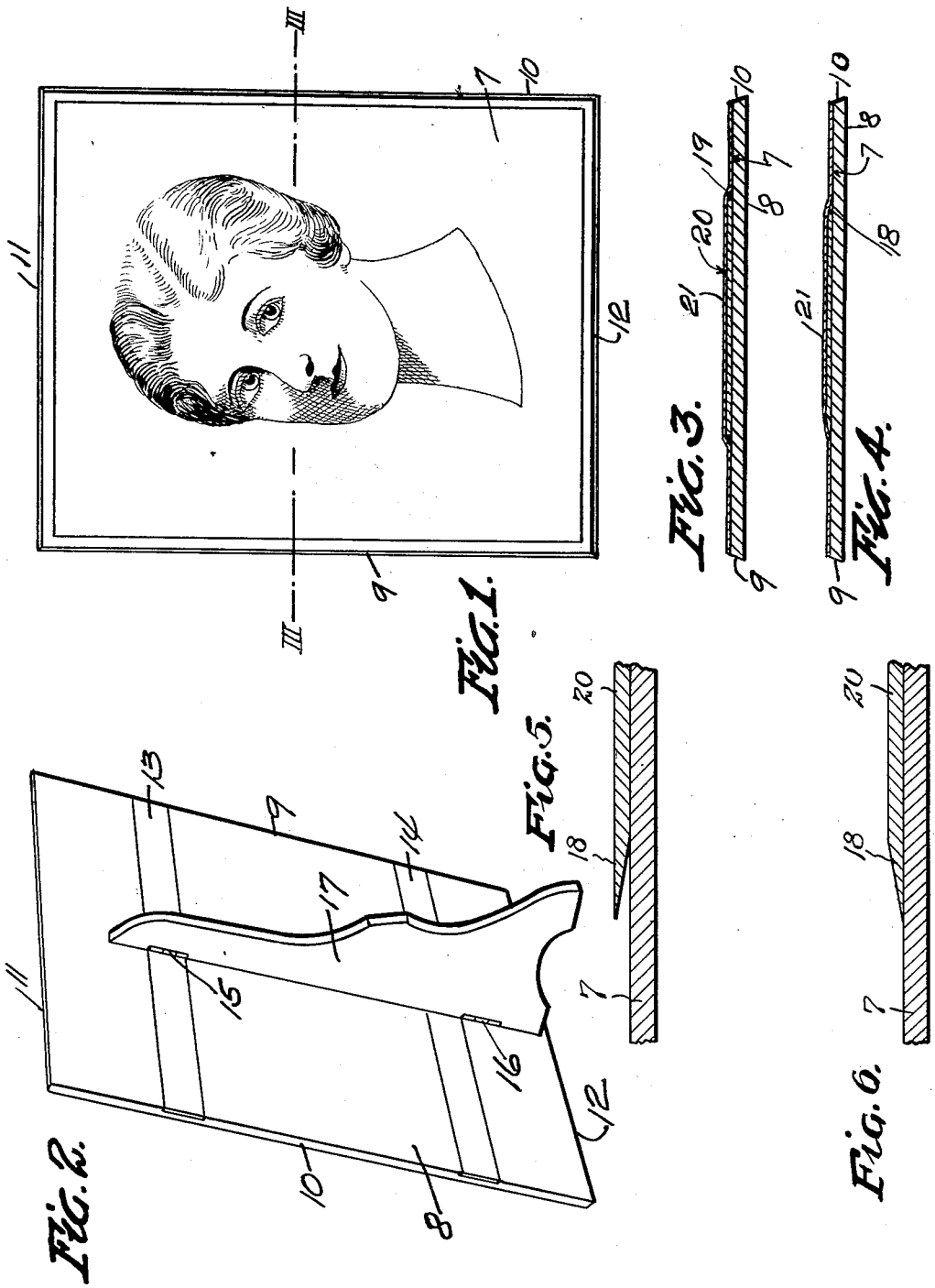
INVENTOR
Ralph O. Clark
by J. H. Weakerford
Atty.

Patented July 11, 1933

1,917,922

UNITED STATES PATENT OFFICE

RALPH C. CLARK, OF MEMPHIS, TENNESSEE

PHOTOGRAPH MOUNTING

Application filed November 19, 1932. Serial No. 643,394.

This invention has general reference to photographs, prints, cuts and the like, mounted upon suitable panels, mats, plaques or other forms of backing, and to methods of performing the mounting operation; but more specific reference will be made hereinafter to photographs or other pictorial matter, mounted upon panels of wood, or of other substances having the appearance and characteristics of wood, and to a new and improved method of effecting such mounting.

In order to facilitate and simplify the disclosure of my present invention, I have illustrated in the accompanying drawing, and shall describe hereinafter, an embodiment thereof in which a photograph is mounted upon a wooden panel; but I do not intend or desire that my invention shall be construed as being limited to any specific form of pictorial matter, or to any particular character of mounting, or, in fact, to any detail not definitely claimed.

The principal object of this invention is to improve upon the mounted photographs, and the like and the methods of mounting them, known heretofore, and to overcome the objections thereto, particularly in the following respects:—

*First*—By providing a mounted photograph which will present substantially the same appearance as though the photograph had been taken directly upon the mounting, since there will be no perceptible line or lines of demarkation between the two.

*Second*—By providing a mounted photograph in which the pictured object will blend with the background supplied by the mounting, in much the same way that a photograph ordinarily blends with the background pictured with it.

*Third*—By providing a mounted photograph in which there shall be no perceptibly abrupt break in the surface at the juncture of the marginal line or lines of the photograph with its mounting.

*Fourth*—By providing a mounted photograph in which there shall be a gradual and substantially imperceptible slope from the surface of the photograph to that of the mounting.

*Fifth*—By providing a mounted photograph having a transparent, hard varnish, or other such finishing substance, flowed over, or otherwise suitably applied to, both the photograph and the adjacent surface of the mounting, so as to assist in producing the results described in paragraphs "first" to "fourth", inclusive.

*Sixth*—By affording a method of mounting photographs, by which the foregoing results may be produced.

The means by which the foregoing and other objects are accomplished by my invention, and the manner of their accomplishment, readily will be understood from the following description when read in connection with the accompanying drawing, in which—

Fig. 1 is a front elevation of a mounted photograph embodying my invention, in which a photograph of a woman's head is mounted upon a wooden panel.

Fig. 2 is a perspective view of the rear side of said panel, showing the means for holding it in an upright position.

Fig. 3 is a transverse sectional view, taken substantially on the line III—III of Fig. 1 but showing an alternate form of mounting.

Fig. 4 is a view similar to Fig. 3, but showing a preferred form of my improved mounting.

Fig. 5 is an enlarged fragmentary view showing the beveled edge of the print before it is pressed down on the mount; and Fig. 6 is a similar view showing the print after having been secured to the mount.

Referring first to Figs. 1, 2 and 3, the wooden panel is shown as being rectangular in shape, but manifestly may be of any desired peripheral configuration. Said panel has a plane front surface 7, a rear surface 8, side edges 9 and 10, a top edge 11, and a bottom edge 12.

As shown in Fig. 2, the back of the panel is grooved transversely for the reception of wooden or other reinforcing members 13 and 14, which preferably are secured in place by means of glue or other suitable adhesive, and which have their ends flush with the side edges 9 and 10, but, especially if formed of wood or the like, may project somewhat beyond the rear surface 8. Hinges 15 and 16 are secured to the back of the panel or to the transverse members 13 and 14, respectively, and serve to support a swing bracket 17 in such a way that it may either be folded to a position substantially parallel with the back of the panel, or may be swung outward so as to support the panel in an upright or upwardly-inclined position.

As indicated in Figs. 3, 4, 5 and 6, the face of the panel at and near that portion to which the photograph is to be applied, preferably is a plane surface; but, while the drawing also shows the remainder of said surface as lying in the same plane with the photograph-receiving portion, it is obvious that this need not be the case except as regards that portion of the mounting which is immediately adjacent the photograph, and that other portions of the mounting may be raised, depressed, carved, scrolled, or otherwise shaped or embellished.

Heretofore, it has been the practice when mounting photographs, merely to place the photograph upon the mounting, and attach it thereto by means of an adhesive; and, even if the photograph be taken on a very thin substance, and it be pressed very tightly down upon the mounting, and even tho a transparent varnish, or other such finishing substance, be subsequently applied to the photograph and the adjacent surface of the mounting, the result will not be satisfactory. That is, there will be a more or less abrupt break along the line or lines of juncture of the photograph and its mounting. Also, in appearance the photograph will be clearly differentiated from its mounting, due partly to the fact that the edge or edges of the photograph will not tone in either with the photograph or with the mounting, and hence will appear as a line or lines of demarkation between the two; and also due to the fact that the lines, colors or shading of the photograph will not blend with the background provided by the mounting.

In the preferred form of my invention, as shown in Figures 4, 5 and 6, the edges 18 of the photograph are beveled, or otherwise similarly treated, and after the surface finish has been applied, the juncture of the photograph and its mounting is practically imperceptable. In Fig. 5 the beveled edge 18 is shown as it appears before being pressed down into place; and in Fig. 6 it is shown as having been pressed down and secured to the surface 7 of the panel.

The alternate form of the invention shown in Fig. 3, contemplates the use of a filter material, indicated by the reference character 19, to provide the desired gradual slope from the plane surface 20 of the photograph to the surface 7 of the panel.

But, in addition to the foregoing provisions for producing a mounted photograph having a substantially unbroken front surface, my improved method of mounting comprises the following further steps: When the photograph, print, cut, drawing, or the like, presents a definite and substantially unbroken outline, as exemplified by the photograph of a woman's head shown in Fig. 1. I preferably first trim it so as to form a silhouette, so that the mounting will constitute the only background. This of course is not feasible with pictorial matter such, for example, as landscapes or reproductions of flowers, where silhouetting would be difficult if not impossible; and in such cases I ordinarily do not trim the print at all, unless to change it to a desired shape or size, or to remove any portion that does not merge with the background. My next step is to bevel the marginal portions of the photograph, as by scraping, rubbing or paring the rear surface at and near the edge or edges, until the marginal thickness is reduced to a minimum. A suitable adhesive is then applied to the rear surface of the photograph, and it is placed in the desired position upon the mounting, and held tightly and smoothly thereagainst until the adhesive sets. I then retouch the mounting, and the photograph if necessary, at and near the edge or edges of the photograph, so that the photograph tones in with the background formed by the mounting, and there is no perceptible abrupt change in apearance at the junction of the two. Finally, I apply to the surfaces of the photograph and the mounting a thin film 21 of transparent varnish or other suitable substance adapted to provide a smooth, hard, and preferably waterproof coating.

When for any reason it is not feasible or desirable to bevel the edge or edges of the photograph, I obtain a somewhat similar result by employing a suitable filling material, preferably colorless or of a neutral color, and of such a character as to adapt it for retouching, for forming a uniform and gradual slope downward from the surface of the photograph to that of the mounting, as indicated in Fig. 3 of the accompanying drawing. The retouching, and the application of the surface finish, are then proceeded with as before.

I have found in practice that by following out the process described herein it is commercially feasible to mount a photograph or other pictorial matter upon a wooden panel, and even upon one in which the grain of the wood shows clearly, in such a way as to create the occular impression of a single picturization.

It will of course be understood that in the sections the thickness of both the pictorial matter and the final covering therefor have been exaggerated and that the results herein obtained will be more effective and the blending more perfect with a normal thickness of such matter.

Having now fully disclosed my invention, what is claimed is:

1. In combination, a photograph or the like and a mounting therefor, in which the surface bearing the pictorial matter is sharply beveled at the under side of its marginal portions, and slopes gradually to the surface of the mounting, whereby there is substantially no visually perceptible surface irregularity at the juncture of said two surfaces.

2. In combination, a photograph or the like and a mounting therefor, comprising a sheet of material upon which the pictorial matter appears, and a panel of different material constituting a mounting therefor; the marginal portions of said sheet being sharply beveled at their under sides, and sloping gradually and uniformly toward a surface of said panel, and said pictorial matter toning in with the background formed by said mounting, whereby there is substantially no visually perceptible surface irregularity at the juncture of said two materials, and the ocular impression of a single picturization is created.

In testimony whereof I hereunto affix my signature.

RALPH O. CLARK.